United States Patent
Jhanson et al.

(10) Patent No.: US 6,358,073 B1
(45) Date of Patent: Mar. 19, 2002

(54) WIRING ASSEMBLY

(75) Inventors: H. Lloyd Jhanson, Troy, MI (US); Robert W. Hurd, Stow, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/675,037

(22) Filed: Sep. 28, 2000

(51) Int. Cl.⁷ .................... H01R 3/00; H01R 39/00; H01R 41/00
(52) U.S. Cl. .................................... 439/164; 439/4
(58) Field of Search ........................ 439/164, 501, 439/4; 174/72 A

(56) References Cited

U.S. PATENT DOCUMENTS

| | | | |
|---|---|---|---|
| 5,319,880 A | * 6/1994 | Kuhlman | 49/360 |
| 5,581,944 A | * 12/1996 | Kornbrekke et al. | 49/28 |
| 5,832,669 A | * 11/1998 | Mizuki et al. | 49/360 |
| 5,884,433 A | * 3/1999 | Watanabe et al. | 49/360 |
| 6,108,976 A | * 8/2000 | Kato et al. | 49/360 |
| 6,231,113 B1 | * 5/2001 | Armbruste et al. | 296/155 |
| 2001/0004022 A1 | * 6/2001 | Kobayashi | 174/72 A |

* cited by examiner

Primary Examiner—Brian Sircus
Assistant Examiner—Chandrika Prasad
(74) Attorney, Agent, or Firm—Thomas N. Twoney

(57) ABSTRACT

A vehicle wiring assembly for supplying power to a sliding door even when the door is open. The assembly includes a cable having a first end attached to the vehicle and a second end attached to a predetermined position on the sliding door. The assembly also includes a winding device disposed along the cable and attached to either the vehicle or the sliding door. The assembly also includes a cable guide at a point spaced away from the winding device for guiding the cable when the sliding door opens and closes.

10 Claims, 3 Drawing Sheets

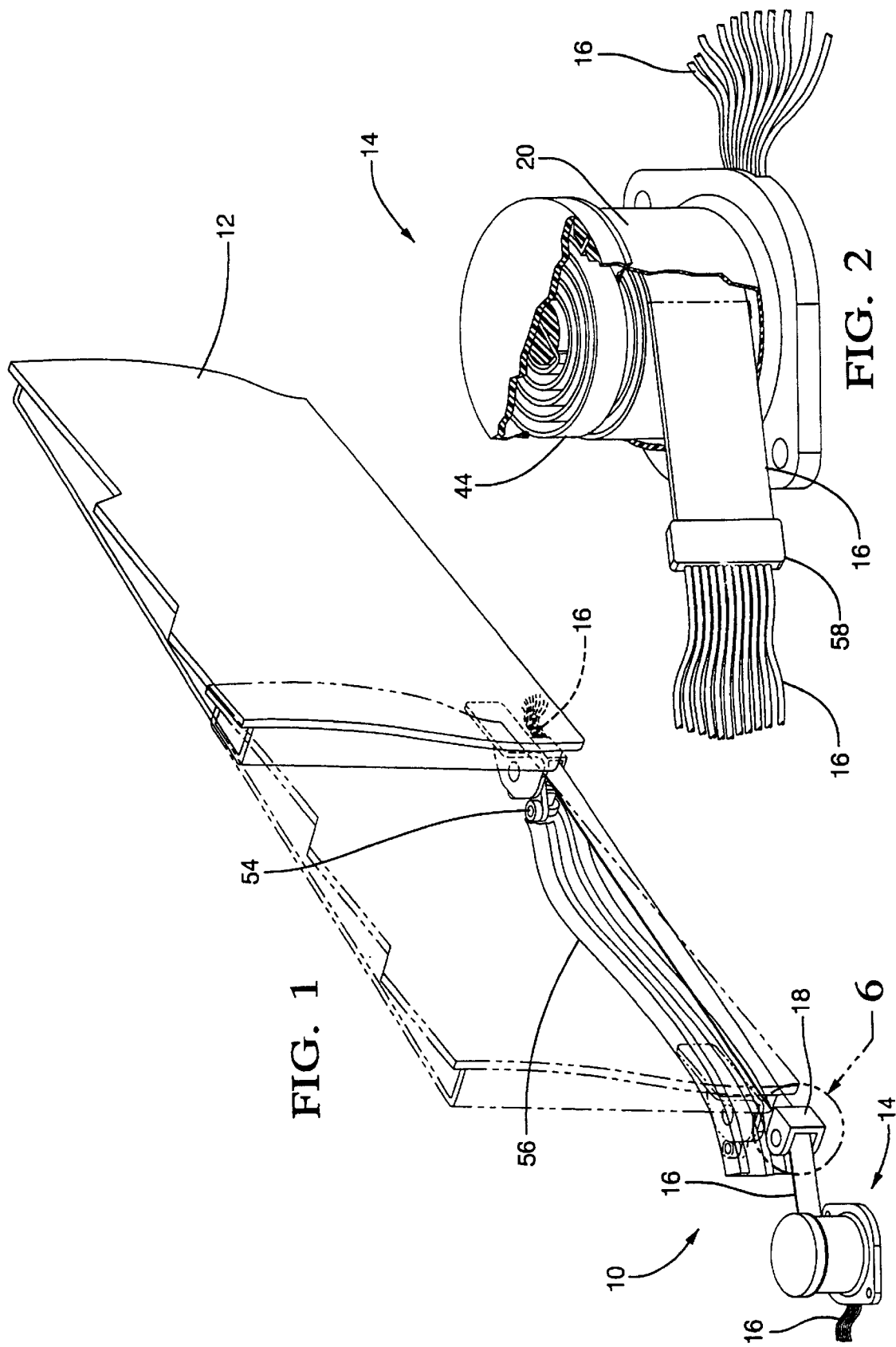

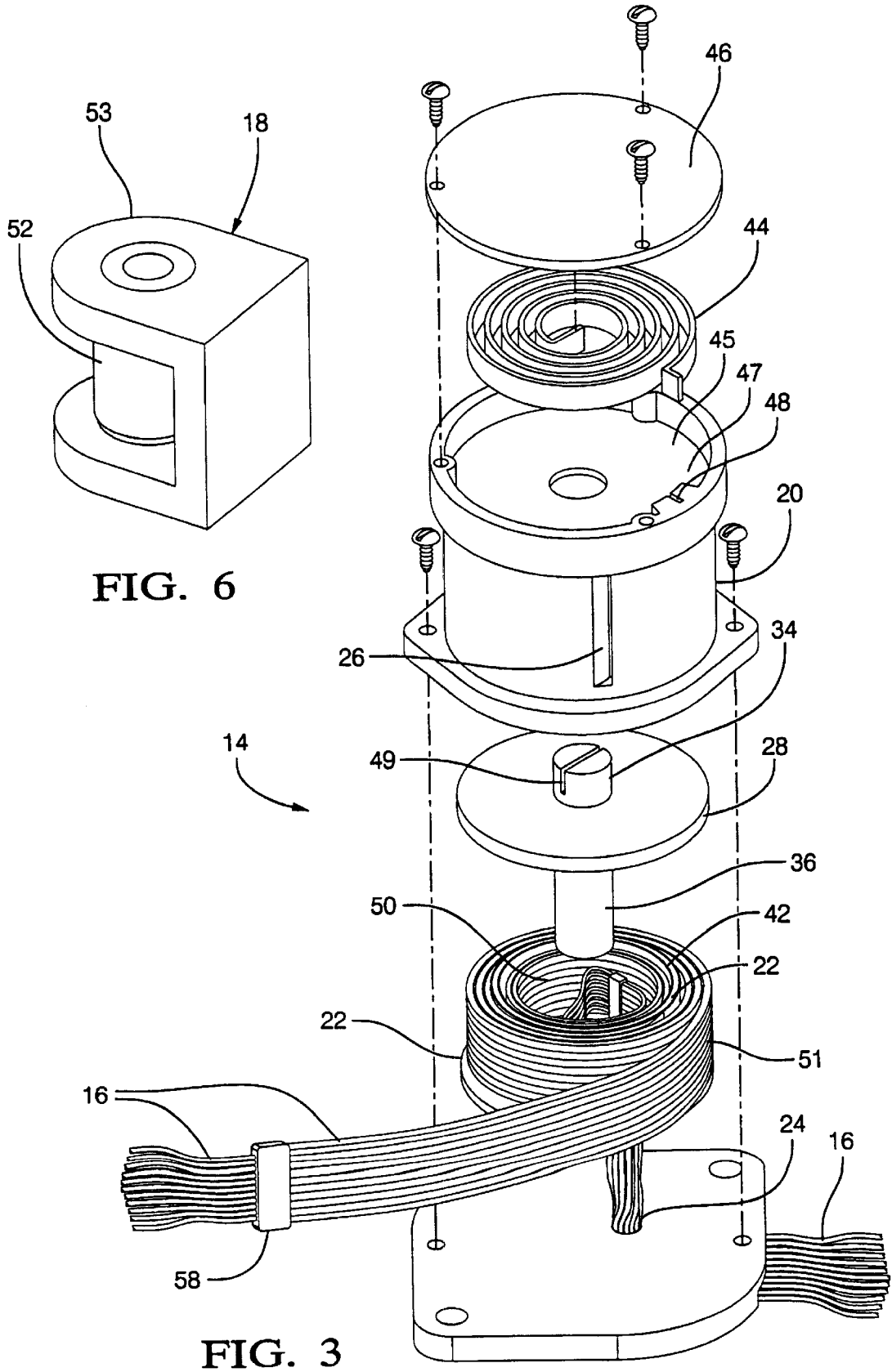

WIRING ASSEMBLY

TECHNICAL FIELD

The field of this invention relates to wiring assemblies, and more particularly to wiring assemblies for vehicle sliding doors.

BACKGROUND OF THE INVENTION

Vehicle makers have long-appreciated the benefits of providing power to sliding doors of the type that are commonly used in vans. This is important in the event that the maker wants to provide lighting or other power accessories in the door. Commonly, the sliding door will have internal wiring that terminates at one end in the lighting or other accessory. At the other end, the wiring terminates in a pressure contact plunger. When the door is closed, the contact plunger mates within a contact pad assembly mounted on the vehicle in the door frame. This arrangement is satisfactory, but it could be improved in several respects. First, the door only gets power when it is closed. When it is open, the plungers disengage the pads and no power travels to the door. Second, the arrangement depends on critical alignments that, if missing, can prevent the door from closing, or lead to breaking the plungers. Also, the plungers are exposed to the environment, making them susceptible to corrosion.

SUMMARY OF THE INVENTION

A wiring assembly includes a cable with a first end adapted to attach to a power source in the vehicle and a second end adapted to attach to the door. Also included is a winding device disposed along the cable and adapted to attach to either the vehicle or the door. Additionally, there is a cable guide attached to either the vehicle or the door at a point spaced away from the winding device for guiding the cable when the door opens and closes.

A feature of the invention is the cable guide, which guides and supports the cable along a non-linear path.

Another feature is that one can provide power to the door even when it is open.

These and other objects, features and advantages of the invention will become more apparent from the following description of a preferred embodiment taken in conjunction with the accompanying drawing.

BRIEF DESCRIPTION OF THE DRAWINGS

The present invention will now be described, by way of example, with reference to the accompanying drawings, in which:

FIG. 1 is a partial side perspective view of the sliding door of a passenger van showing the sliding side door in open and closed positions;

FIG. 2 is a perspective view of the wiring assembly with the housing partially cut away to show the cable, spring, and portions of the drum;

FIG. 3 is an exploded perspective view of the wiring assembly;

FIG. 6 is a perspective view of the cable guide.

DETAILED DESCRIPTION OF THE PREFERRED EMBODIMENT

Referring to the Figures wherein like numerals indicate like or corresponding parts throughout the several views, a wiring assembly is generally shown at 10 for providing power to a vehicle sliding door 12 even when the sliding door 12 is open. The wiring assembly 10 comprises a cable-winding device generally shown at 14 and a cable 16 extending through the winding device 14. The cable winding device 14 is adapted to attach either to the vehicle itself or to the sliding door 12. The assembly 10 also includes a cable guide generally indicated at 18 adapted to attach to either the vehicle or the sliding door 12 for guiding the cable 16 as the sliding door 12 opens and closes.

The cable-winding device 14 is generally shown in FIG. 2. The cable 16 can include a variety of wires and cables. For example, the cable 16 can include electrical cables to supply power to the sliding door 12 for purposes of powering various accessories. Also, the cable 16 can include fiber optic wires or cables to provide lighting to certain parts of the door—like the outside door handle, for example. The cable 16 shown is in the form of flat cable, with the constituent wires being aligned in a generally planar or flat fashion.

Figure 4:
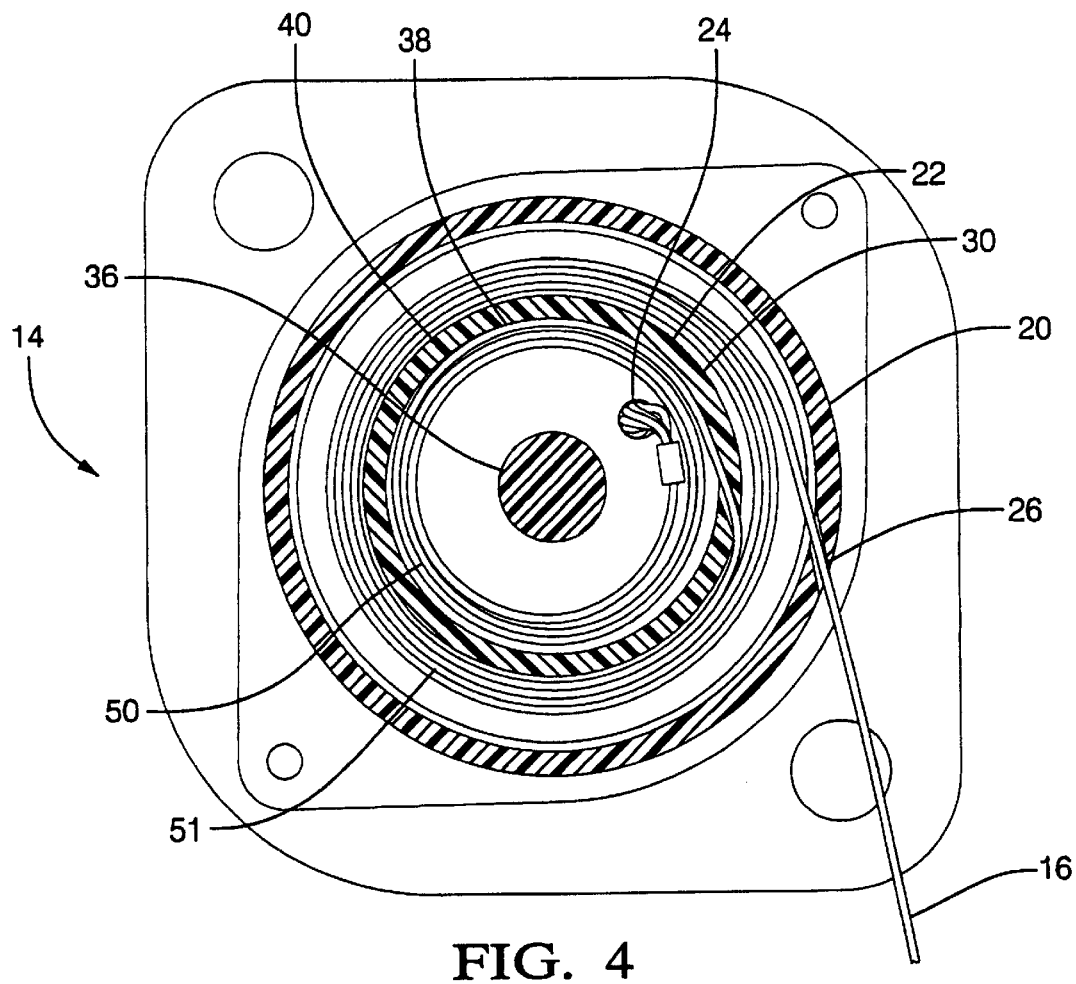
FIG. 4 is a top section view of the wiring assembly with the top portions of the housing and drum removed.
Figure 5:
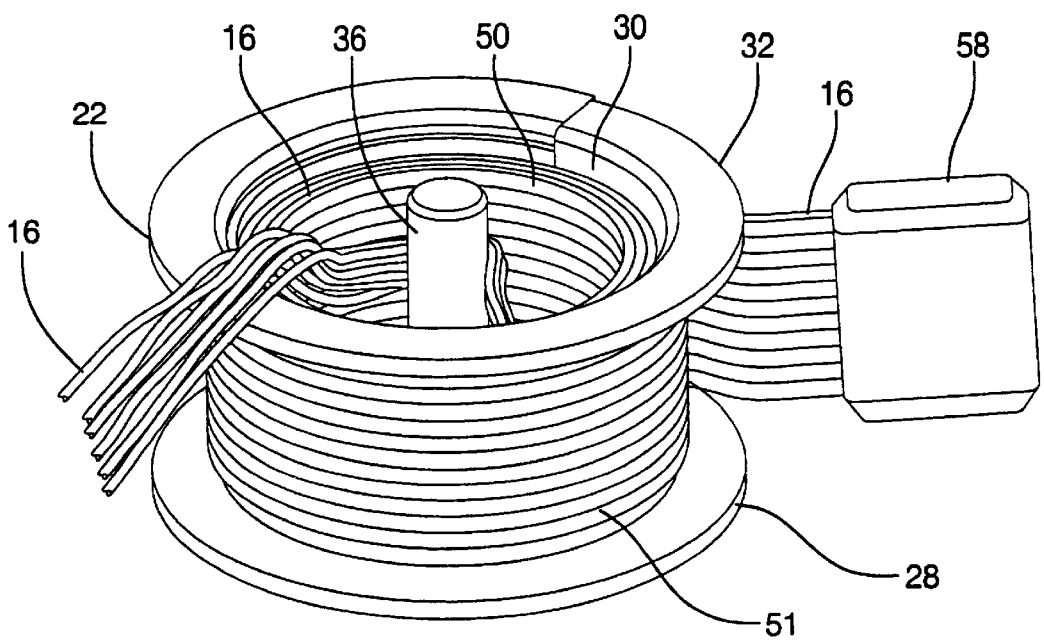
FIG. 5 is a bottom perspective view of the drum with the cable disposed in and around the drum.

According to one embodiment shown in FIGS. 3–5, the cable-winding device 14 includes a housing 20, a drum 22 and the cable 16. The housing 20, formed of plastic, metal, or some other material, contains a cable input opening 24 and a cable output opening 26. The drum 22 is supported for free rotation in the housing 20. The drum 22, formed of plastic, metal, or some other material, comprises four pieces: a top piece 28, a hollow cylinder 30, a bottom piece 32, and a pin 34.

The hollow cylinder 30 defines a central axis through a solid shaft 36 and has a co-axial inner surface 38 and a spaced apart co-axial outer surface 40. The top piece 28 is attached to a first end 42 of the hollow cylinder 30. The bottom piece 32 is attached to an opposing second end of the hollow cylinder 30. The pin 34 is attached to the top piece 28 along the central axis of the hollow cylinder 30. The assembly 10 also has a spring 44 extending between the housing 20 and the pin 34 biasing the drum 22 in a predetermined rotational orientation relative to the housing 20. The spring 44, formed of plastic, metal, or some other material, resides in a shallow cylindrical depression 45 in the housing 20 between a housing plate 46 of the housing 20 and a drum plate 47 above the drum 22.

The spring 44 has one end adapted to attach to the housing 20 at a housing-notch 48 and an opposing end adapted to attach to the pin 34 at a pin-notch 49. The spring 44 may be shaped as a coil, spiral, (as depicted) or any other shape capable of storing and releasing energy. As the cable 16 extends out of the housing 20, the spring 44 stores energy to facilitate rewinding the cable.

The cable 16 extends through the cable input opening 24 into the hollow cylinder 30. The cable 16 then extends through the hollow cylinder 30. As the cable 16 exits the hollow cylinder 30, it is undisplaceably supported, or pinched, in the wall of hollow cylinder 30 so the amount of cable 16 inside the hollow cylinder 30 remains constant. The cable 16 then extends around the hollow cylinder 30 and out of the cable output opening 26. The cable 16 includes a buffer length 50 spirally disposed within the hollow cylinder 30. There is also a payout length 51 disposed around the outer surface 40 of the hollow cylinder 30 for winding and unwinding.

As shown in FIG. 4, a benefit of this arrangement is the position of the cable input opening 24 offset from the central axis of the drum 22. The cable 16 is not limited to enter the drum 22 through the solid shaft 36, but can be placed anywhere within the drum 22 to adequately provide for cable rotations. As a result, there is a reduced number of components used to provide power to the vehicle sliding door 12 even when the sliding door 12 is open. This arrangement is an improvement over the arrangement shown in prior art patents such as U.S. Pat. No. 5,322,171 issued to Steff on Jul. 26, 1994.

When the cable 16 exits the housing 20 it is then orientated by the cable guide 18 depicted in FIG. 6. The cable guide 18 has a post 52 and a U-shaped cover 53 pivotally mounted on the post 52 to define a cable guide opening with the post 52. Alternatively, the cable guide 18 comprises a standard fairlead having a roller rotatably mounted therein to entrain the cable 16 thereover.

Vehicles such as passenger vans typically have a hinged front passenger door and a side sliding door 12. The sliding door 12 is commonly mounted on rollers 54 that run in tracks 56. The sliding door 12 historically is on the passenger side of the vehicle, but in recent years vans with sliding doors 12 on both sides of the vehicle have become popular. This is also true of cargo or utility vans. Cargo or utility vans have the same body structure as the passenger vans but have interiors that are outfitted to carry cargo or for some other purpose.

The operation of the sliding door 12 for a van-type vehicle is well known and understood and need not be described in detail. The sliding door 12 moves from an open position shown in solid line in FIG. 1 toward the front of the van and horizontally inwardly to a closed position for closing and sealing the side opening shown in dashed line. Inward horizontal movement of the sliding door 12 is achieved by curving a forward end of the tracks 56.

In operation, as the cable 16 extends, unwinds, or unspools, the drum 22 rotates in either a clockwise or counter-clockwise direction, depending upon the orientation of the housing 20. During the rotation of the housing 20, the spring 44 winds into an energized state. The spring 44 returns the drum 22 to its initial state after the sliding door 12 operation. The wound buffer length 36 coils to compensate each rotation of the drum 22. The compensating effect of the buffer length 50 provides the static positioning desired during the rotation of the drum 22. Without the buffer length 50 compensating for each drum rotation, the cable 16 contained therein would wind around the solid shaft 36, which is undesirable since there would be an increased risk of the cable 16 twisting and pinching.

The cable 16 leaves the housing 20 in a direction such that its orientation is modified by the cable guide 18. The cable 16 typically transverses the length of the sliding door 12 in a groove between the tracks 56 and the body of the vehicle. The cable 16 terminates at a cable-to-round wire junction 58 located at a support arm for the sliding door 12. At this location, the cable 16 feeds power into the sliding door 12.

What is claimed is:

1. An electrical wiring assembly for a vehicle for providing power to a sliding door of the vehicle even when the door is open comprising:

an electrical cable with a first end adapted to attach to a power source in the vehicle and a second end adapted to attach to the door;

a winding device disposed along the cable and being adapted to attach to one of the vehicle and the door; and a cable guide adapted to attach to one of the vehicle and the door at a point spaced away from the winding device for guiding the cable when the door opens and closes.

2. The wiring assembly of claim 1, wherein the cable guide has a post and a U-shaped cover pivotally mounted on the post to define a cable guide opening with the post.

3. The wiring assembly of claim 1, wherein the cable guide consists of a standard fairlead having a roller rotatably mounted therein to entrain the cable thereover.

4. An electrical wiring assembly for a vehicle for providing power to a sliding door of the vehicle even when the door is open comprising:

an electrical cable winding device adapted to attach to one of the vehicle and the door including:
a housing defining a cable input opening and a spaced apart cable output opening,
a drum rotatably disposed in the housing, the drum including:
a hollow cylinder defining a central axis and having a co-axial inner surface and a spaced apart co-axial outer surface;
a top piece attached to a first end of the hollow cylinder;
a bottom piece attached to a second opposing end of the hollow cylinder and defining an opening; and
a pin attached to the top piece along the axis of the hollow cylinder;
a spring extending between the housing and the pin biasing the drum in a predetermined rotational orientation relative to the housing; and an electrical cable extending through the cable input opening into the hollow cylinder, through the hollow cylinder, around the hollow cylinder and out of the cable output opening, the cable including:
a buffer length spirally disposed within the hollow cylinder, and
a payout length disposed around outer surface of the hollow cylinder for winding and unwinding.

5. The wiring assembly of claim 4, wherein the cable input opening is spaced away from the axis.

6. The wiring assembly of claim 4, wherein the top piece is a disk.

7. The wiring assembly of claim 4, wherein the bottom piece is a ring extending radially beyond the hollow cylinder to support the payout length.

8. The wiring assembly of claim 4, wherein the pin extends down from the top piece to the housing.

9. The wiring assembly of claim 4, wherein the hollow cylinder defines a cable pass-through extending from the inner surface to the outer surface.

10. The wiring assembly of claim 4, wherein the hollow cylinder further comprises a cable retainer adjacent the cable pass-through to keep the buffer length inside the hollow cylinder.

* * * * *